(No Model.) 3 Sheets—Sheet 1.
J. McMANUS.
VARIABLE SPEED MECHANISM FOR BICYCLES.
No. 549,459. Patented Nov. 5, 1895.
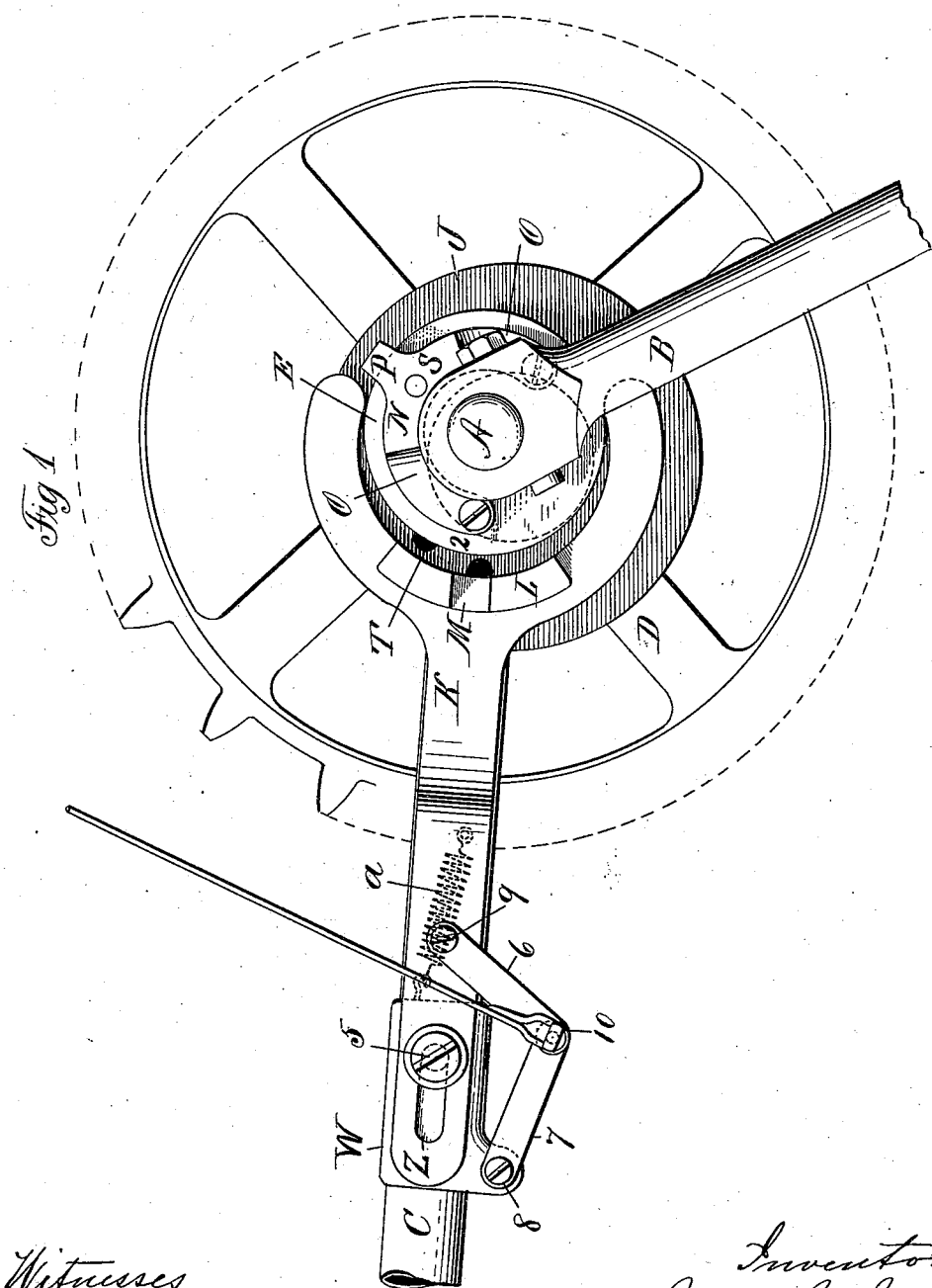

(No Model.) 3 Sheets—Sheet 2.
J. McMANUS.
VARIABLE SPEED MECHANISM FOR BICYCLES.
No. 549,459. Patented Nov. 5, 1895.
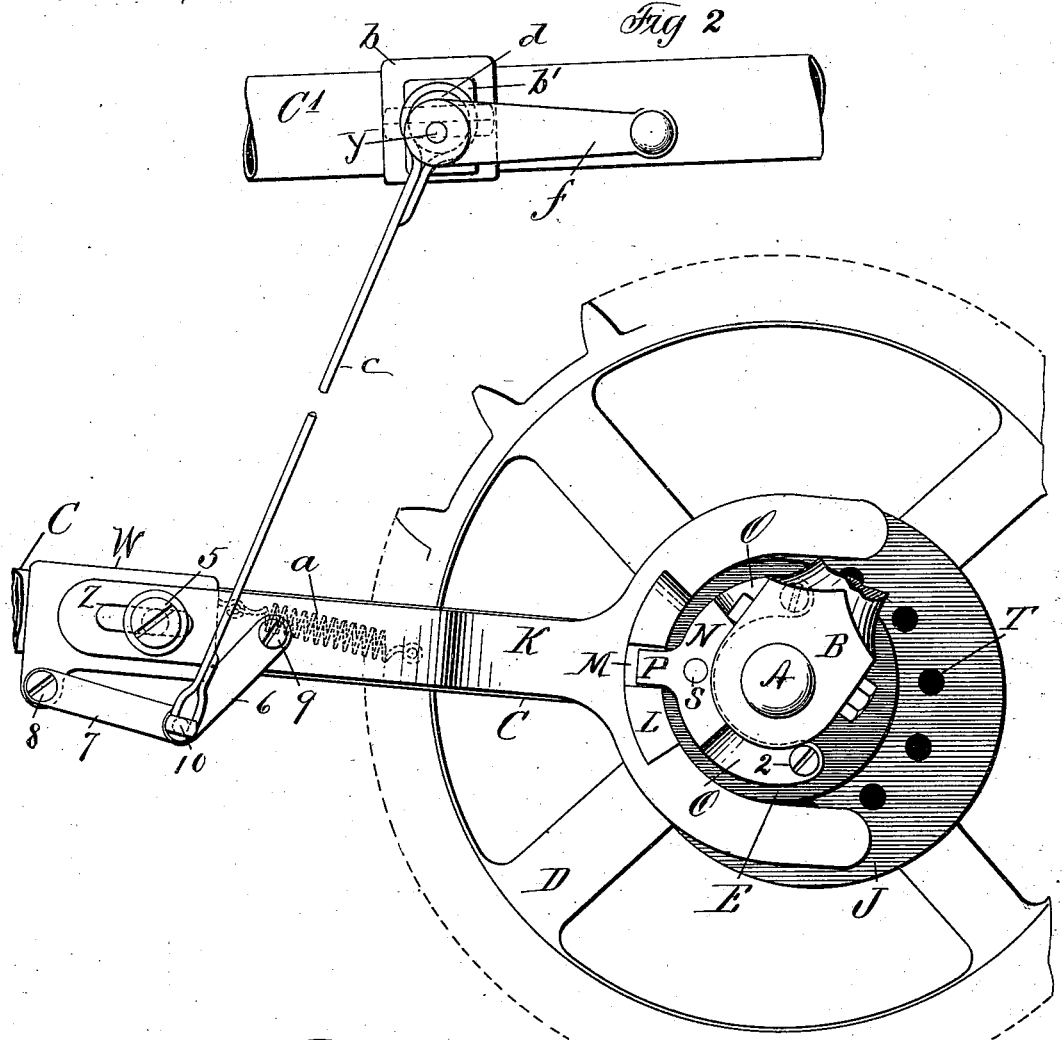
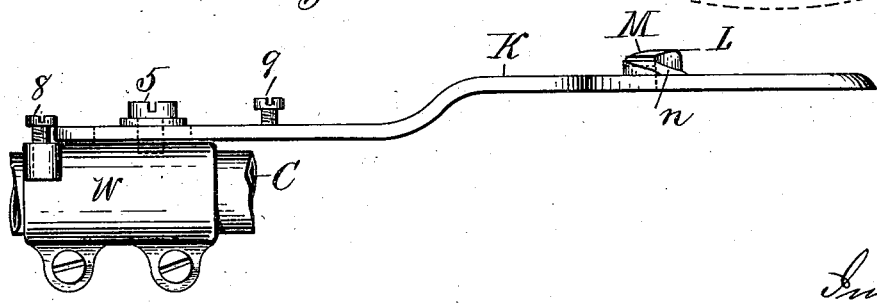

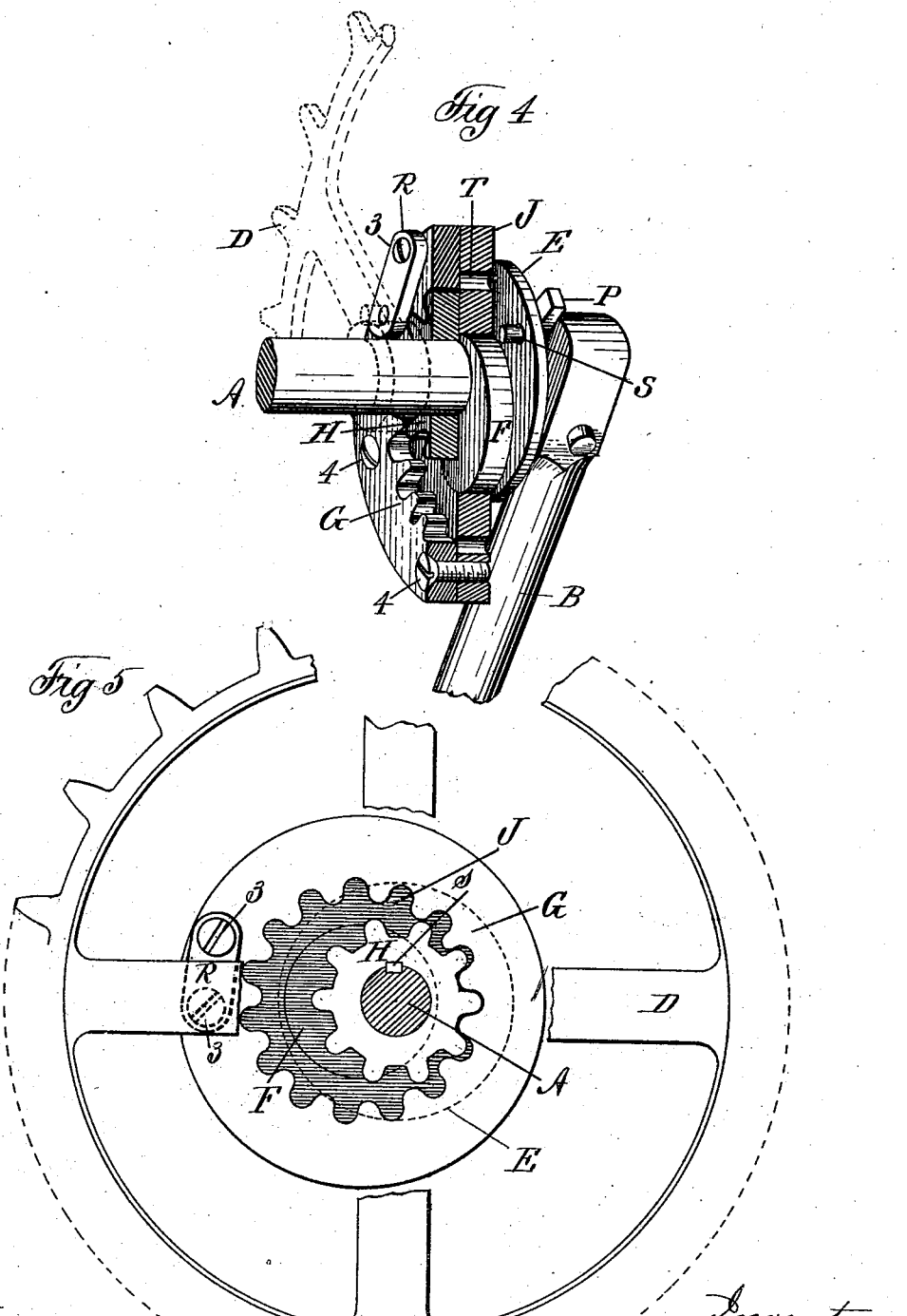

ated November 5, 1895.

UNITED STATES PATENT OFFICE.

JAMES McMANUS, OF CHICOPEE, ASSIGNOR OF ONE-HALF TO ALBERT F. PIERCE, OF SOUTH HADLEY FALLS, MASSACHUSETTS.

VARIABLE-SPEED MECHANISM FOR BICYCLES.

SPECIFICATION forming part of Letters Patent No. 549,459, dated November 5, 1895.

Application filed September 5, 1894. Serial No. 522,174. (No model.)

*To all whom it may concern:*

Be it known that I, JAMES MCMANUS, a citizen of the United States of America, residing at Chicopee, in the county of Hampden and State of Massachusetts, have invented new and useful Improvements in Variable-Speed Mechanism for Bicycles and Analogous Vehicles, of which the following is a specification.

This invention relates to driving mechanism for bicycles and similar vehicles, the object being to provide improved devices between the crank-shaft and the sprocket-wheel thereon for varying the rotary speed of the latter; and the invention consists in the peculiar construction and arrangement of the operative parts of said mechanism, all as hereinafter fully described, and more particularly pointed out in the claims.

Reference is to be made to the following drawings, in which—

Figure 1 is an outer side elevation of a portion of the pedal-crank, the end of the crank-shaft, a portion of the frame of a bicycle adjacent to said shaft, and a portion of the sprocket-wheel thereon, having variable-speed mechanism applied thereto, constructed according to my invention. Fig. 2 is a similar view to Fig. 1, but showing an additional part of the frame of a bicycle and means for operating the clutch parts of said mechanism. Fig. 3 is an edge view of the clutch shown in Figs. 1 and 2, together with a part of the frame of the machine to which it is attached. Fig. 4 is a perspective sectional view of a part of said crank-shaft and of parts of said variable-speed mechanism thereon behind the crank, and showing in dotted lines a portion of a sprocket-wheel, indicating its operative relation to said mechanism. Fig. 5 is a plan view of the differential gears of said mechanism and of the rear or inner side of parts of the sprocket-wheel, showing a connection between one of said gears and the sprocket-wheel.

In the drawings, A is the crank-shaft of a bicycle. B is the crank, and D is the usual driving sprocket-wheel mounted loosely on said shaft. Intermediate of said crank and said sprocket-wheel on the shaft A are placed the following-named parts: Adjacent to the inner side of the crank B on shaft A is secured the combined circular plate or disk E and the eccentric F, preferably integrally formed. Said disk has a periphery concentric with shaft A. On said eccentric F the internal-gear backing-plate J is loosely carried, having a series of pin sockets or holes T therein. On the side of said plate J is secured, by screws 4 or other suitable means, the internal gear G. Said internal gear and plate J are here shown as united separate parts, but they are only so made for convenience; but they may be integrally formed, if preferred. Connection is made between the said gear G and the sprocket-wheel D by a strap or link having pivotal connection with said wheel and gear, whereby they are caused to rotate together, but under certain adjustments of the speed mechanism permitting said gear to obey the eccentric movements induced by the eccentric F while rotating in engagement with said plate J. A pinion H is fixed by a key *s* or other suitable means on shaft A and engages with said internal gear G.

A segment-shaped spring N is secured to the outer side of the plate E by screws 2 through its ends, as shown in Figs. 1 and 2, and about midway between said ends is a stop or clutch projection P. A pin S is fixed in said spring, (see Figs. 1, 2, and 4,) which extends through said plate E and is capable of engagement with and disengagement from the holes T in plate J. Said pin S serves as a clutch-pin in engaging with the gear G or its backing-plate J, rigidly fixed thereon.

On a part C of the frame of the vehicle a clutch-bar K is attached in any suitable manner, whereby it may have a movement toward and from the said mechanism on the crank-axle A. The preferable means for so attaching said bar K and for giving it said movement consist of devices constructed and arranged as follows: A sheet-metal clip W is clamped around the frame part C and there secured, as shown in Fig. 3, said clip having a flat side, upon which the end of the clutch-bar K is held in a sliding position by a screw 5, passing through a slot Z therein and engaging with said clip. Said screw is adjusted so as not to bind said bar and prevent free longitudinal movement thereof. The opposite end of said bar K at the side of the plate J is preferably of forked shape, as shown, so that it may lie upon the periphery of the disk E, on which it has said sliding movement. On the side of said bar K, near said disk E, is a boss L, having inclined extremities and a slot M therein, the bottom $n$ of which slot (see Fig. 3) is of a wedge or cam shape. A spring $a$, lying between said bar and frame part C, has one end attached to bar K and its opposite end attached to said clip or frame part and acts to slide said bar, so that its forked end is thereby held away from the periphery of said disk E in the position shown in Fig. 1. When the bar K is in the last-named position and the disk E is rotated and the stop projection P is carried over said boss L on bar K, said projection or arm first springs more or less away from said disk by its engagement with one of said inclined extremities of the boss L, and on arriving at the slot M in said boss projection P drops into it, thereby arresting the rotary movement of the disk E and the eccentric F on shaft A. The clutch-bar K is moved forward into engagement with said projection P (against the action of spring $a$) by any suitable means, the most preferable being illustrated in Figs. 1 and 2, and embody the following devices: A toggle connection between said clip W and the bar K is formed by means of two levers 6 and 7, one being pivotally connected at 8 to the clip W and the other being in like manner connected to the bar K at 9, and the opposite ends of said levers being united pivotally at 10. For operating said toggle connection a rod $c$ is connected by one end to said pivot 10, as shown, and extends upwardly to a part C' of the frame. A clip $b$ is secured on said part C' of the frame, and on a pivot-stud $y$, fixed on said clip, is a circular cam $d$, having a handle $f$ thereon within easy reach of the rider of the vehicle. The upper end of said rod $c$ is looped and secured around said cam $d$. By seizing said handle $f$ and turning said cam when the toggle-levers have the positions shown in Fig. 1 the said levers are caused to assume substantially the positions shown in Fig. 2, whereby the bar K is brought to a position which secures its engagement with the projection or arm P, as aforesaid. On turning the handle $f$ in an opposite direction the spring $a$ is left free to act to retire said bar to the position shown in Fig. 1.

The operation of the speed-varying devices is as follows: The pin S, carried on arm or projection P, is normally in engagement with one of the holes T in the plate J—that is to say, when the sprocket-wheel D is driven directly by the crank B. Under these conditions the clutch-bar K occupies the position (free from projection P) shown in Fig. 1. Therefore said pin S being in engagement with one of the holes T in plate J, and said plate being fixed to internal gear G, and the latter being in engagement with the pinion H, which is keyed to the crank-shaft A, it follows that the engagement of said pinion H with gear G causes that and the parts J, E, F, and P, and the sprocket-wheel, which is connected to the gear G, as described, all to be rotated uniformly with the crank, and the axis of rotation of all the parts when in said positions is the axis of the crank-shaft A.

To reduce the speed of rotation of the sprocket-wheel relative to that of the crank-shaft, and thereby to decrease the resistance of the pedals when hill-climbing or running on sandy or bad roads, the lever $f$ is operated, as described, to move the bar K into engagement with the projection P, the result of which is to disengage pin S from plate J and hold plate E from further rotation. This leaves the plate J and gear G thereon free to be rotated by the pinion H on the eccentric F, the latter being concentric with said plate and gear, and the reduced speed of the sprocket-wheel is proportionate to relative diameters of the driving-pinion H and the internal gear G.

The operation of the clutch-bar K for engaging it with and disengaging it from the projection or arm P is effected while the vehicle is in motion.

I do not claim in change-gearing the combination of a driving-pinion, an internal gear in mesh therewith, a support for said internal gear loosely mounted concentrically with the said driving-pinion and holding the internal gear eccentric thereto, a driven wheel concentric with the driving-pinion, permanently interlocked parts rotatively connecting the internal gear and the driven wheel, with provisions for relative radial movement, and means for holding the internal-gear support stationary, as I am not the first inventor thereof.

What I claim, and desire to secure by Letters Patent, is—

1. Variable speed mechanism for bicycles and analogous vehicles, consisting of a pinion fixed on the driving-shaft thereof, a disk free thereon having a periphery concentric with said shaft and an eccentric rigid on said disk, a spring secured on said disk having a stop-projection thereon extending beyond the periphery of said disk, and carrying a clutch-pin extending therethrough, combined with an internal gear of greater diameter than said pinion and engaging therewith mounted on said eccentric, and having clutch-pin sockets therein, a sprocket-wheel free on said shaft, a connection between said internal gear and sprocket-wheel permitting said gear to move eccentrically to the axis of said wheel, and a clutch-bar for engagement with said stop-projection thereby arresting the rotary motion of said eccentric and disengaging said clutch-pin from said sockets in said internal gear, substantially as set forth.

2. Variable speed mechanism for bicycles and analogous vehicles, consisting of a pinion fixed on the driving-shaft thereof, a disk free thereon having a periphery concentric with said shaft and an eccentric rigid on said disk, a spring secured on said disk having a stop-projection thereon extending beyond the periphery thereof, and carrying a clutch-pin extending therethrough, combined with an internal gear of greater diameter than said pinion and engaging therewith mounted on said eccentric, and having clutch-pin sockets therein, a sprocket-wheel free on said shaft, a connection between said internal gear and sprocket-wheel permitting said gear to move eccentrically to the axis of said wheel, a clutch bar connected with, and having a longitudinal movement on, the frame of the machine toward and from said stop-projection, whereby said bar is engaged with, and disengaged therefrom, and means for moving said bar, substantially as set forth.

3. Variable speed mechanism for bicycles and analogous vehicles, consisting of a pinion fixed on the driving-shaft thereof, a disk free thereon having a periphery concentric with said shaft and an eccentric rigid on said disk, a spring secured on said disk having a stop-projection thereon extending beyond the periphery thereof, and carrying a clutch-pin extending therethrough, combined with an internal gear of greater diameter than said pinion and engaging therewith mounted on said eccentric, and having clutch-pin sockets therein, a sprocket-wheel free on said shaft, a connection between said internal gear and sprocket-wheel permitting said gear to move eccentrically to the axis of said wheel, a clutch-bar having a slotted cam thereon, resting by one end on the periphery of said disk, and connected with, and having a longitudinal movement on the frame of the machine toward and from said stop-projection whereby said slotted cam is brought under said stop-projection, and withdrawn therefrom, and means for moving said clutch-bar, substantially as set forth.

4. Variable speed mechanism for bicycles and analogous vehicles, consisting of a pinion fixed on the driving-shaft thereof, a disk free thereon having a periphery concentric with said shaft and an eccentric rigid on said disk, a spring secured on said disk having a stop-projection thereon extending beyond the periphery thereof, and carrying a clutch-pin extending therethrough, combined with an internal gear of greater diameter than said pinion and engaging therewith mounted on said eccentric, and having clutch-pin sockets therein, a sprocket-wheel free on said shaft, a connection between said internal gear and sprocket-wheel permitting said gear to move eccentrically to the axis of said wheel, a clutch-bar having a slotted cam thereon, resting by one end on the periphery of said disk, and connected with, and having a longitudinal movement on the frame of the machine toward and from said stop-projection whereby said slotted cam is brought under said stop-projection, and withdrawn therefrom, and a spring for moving said bar in one of said directions, and a toggle-connection between said bar and a fixed part on the frame of the machine, a cam and a lever on a higher part of said frame connected by a rod with said toggle-connection, for moving said bar in the opposite direction, substantially as set forth.

JAMES McMANUS.

Witnesses:
H. A. CHAPIN,
K. I. CLEMONS.